United States Patent
Zhu et al.

(10) Patent No.: US 12,166,181 B2
(45) Date of Patent: Dec. 10, 2024

(54) ELECTRODE ASSEMBLY, AND LITHIUM ION ELECTRIC ROLL USING THE ELECTRODE ASSEMBLY

(71) Applicant: DONGGUAN AMPEREX TECHNOLOGY LIMITED, Dongguan (CN)

(72) Inventors: Junliang Zhu, Dongguan (CN); Haibing Wang, Dongguan (CN); Tongming Dong, Dongguan (CN); Wenqiang Cheng, Dongguan (CN); Baohua Chen, Dongguan (CN); Shufeng Wu, Dongguan (CN); Wei Yang, Dongguan (CN); Zhihua Qin, Dongguan (CN); Meina Lin, Dongguan (CN)

(73) Assignee: DONGGUAN AMPEREX TECHNOLOGY LIMITED, Guangdong (CN)

( * ) Notice: Subject to any disclaimer, the term of this patent is extended or adjusted under 35 U.S.C. 154(b) by 747 days.

(21) Appl. No.: 16/733,087

(22) Filed: Jan. 2, 2020

(65) Prior Publication Data

US 2020/0136194 A1    Apr. 30, 2020

Related U.S. Application Data

(63) Continuation of application No. 16/107,831, filed on Aug. 21, 2018, now Pat. No. 10,840,557, which is a (Continued)

(30) Foreign Application Priority Data

Dec. 14, 2015    (CN) .......................... 201510932557.3

(51) Int. Cl.
*H01M 10/0525*    (2010.01)
*H01M 10/052*    (2010.01)
(Continued)

(52) U.S. Cl.
CPC ..... *H01M 10/0587* (2013.01); *H01M 10/052* (2013.01); *H01M 10/0525* (2013.01);
(Continued)

(58) Field of Classification Search
CPC .......... H01M 10/052; H01M 10/0587; H01M 10/0525; H01M 10/0583; H01M 10/0585;
(Continued)

(56) References Cited

U.S. PATENT DOCUMENTS

2014/0072850 A1    3/2014    Kwon et al.
2014/0370362 A1*    12/2014    Park ................. H01M 10/0436
                                                            429/152
2015/0263323 A1*    9/2015    Kim .................. H01M 10/4235
                                                            429/133

FOREIGN PATENT DOCUMENTS

CN    201528017 U    7/2010
CN    202172092 U    3/2012
(Continued)

OTHER PUBLICATIONS

Chinese Office Action, CN201510932557.3, Jun. 28, 2017, 12 pgs.
(Continued)

*Primary Examiner* — Osei K Amponsah
(74) *Attorney, Agent, or Firm* — Morgan, Lewis & Bockius LLP

(57) ABSTRACT

An electrode assembly and a lithium ion electric roll having the same are provided. Also provided is a battery, which includes: a first layer; a second layer located at the side of a surface of the first layer, exposed from the first layer in a first direction view which is perpendicular to a first surface of the first layer; a third layer tucking at least one portion of the second layer with the first layer in the first direction view, being exposed from the second layer in the first direction
(Continued)

view; and a conductive plate protruding from a second side of the first layer in the first direction view.

21 Claims, 5 Drawing Sheets

Related U.S. Application Data continuation of application No. 15/087,096, filed on Mar. 31, 2016, now Pat. No. 10,283,816.

(51) Int. Cl.
*H01M 10/0583* (2010.01)
*H01M 10/0585* (2010.01)
*H01M 10/0587* (2010.01)
*H01M 50/119* (2021.01)
*H01M 50/121* (2021.01)
*H01M 50/124* (2021.01)

(52) U.S. Cl.
CPC ... *H01M 10/0583* (2013.01); *H01M 10/0585* (2013.01); *H01M 50/119* (2021.01); *H01M 50/121* (2021.01); *H01M 50/124* (2021.01); *H01M 2220/30* (2013.01)

(58) Field of Classification Search
CPC .. H01M 50/40; H01M 50/116; H01M 50/183; H01M 2220/30; H01M 50/119; H01M 50/121; H01M 50/124
See application file for complete search history.

(56) References Cited

FOREIGN PATENT DOCUMENTS

| | | |
|---|---|---|
| CN | 203760574 U | 8/2014 |
| CN | 104425795 A | 3/2015 |

OTHER PUBLICATIONS

Chinese Office Action, CN201510932557.3, Feb. 14, 2018, 7 pgs.
Chinese Office Action, CN201510932557.3, Sep. 12, 2018, pgs.
Zhu, Office Action, U.S. Appl. No. 15/087,096, Feb. 22, 2018, 9 pgs.
Zhu, Final Office Action, U.S. Appl. No. 15/087,096, Aug. 14, 2018, 11 pgs.
Zhu, Notice of Allowance, U.S. Appl. No. 15/087,096, Jan. 3, 2019, 8 pgs.
Zhu, Office Action, U.S. Appl. No. 16/107,831, Apr. 3, 2020, 12 pgs.
Zhu, Notice of Allowance, U.S. Appl. No. 16/107,831, Sep. 22, 2020, 7 pgs.

* cited by examiner

Legend:
A3: First edge of first layer
A4: Second edge of first layer
A5: Third edge of first layer
B3: First edge of second layer
B4: Second edge of second layer
B5: Third edge of second layer
C3: First edge of third layer
C4: Second edge of third layer
C5: Third edge of third layer

ELECTRODE ASSEMBLY, AND LITHIUM ION ELECTRIC ROLL USING THE ELECTRODE ASSEMBLY

CROSS REFERENCE TO RELATED APPLICATIONS

The present application is a continuation application of U.S. patent application Ser. No. 16/107,831, filed on Aug. 21, 2018, which is a continuation application of U.S. patent application Ser. No. 15/087,096, filed on Mar. 31, 2016, which claims priority to Chinese patent application No. 201510932557.3, filed on Dec. 14, 2015, all of which are incorporated herein by reference in their entirety.

TECHNICAL FIELD

The present application relates to the field of energy storage devices, and in particular, relates to an electrode assembly, and a lithium ion electric roll using the electrode assembly.

BACKGROUND

With the development of science and technology, a variety of electronic products emerge and almost become an indispensable part in daily life. With advantages of high energy density, long cycle life, environmental friendliness and reproductivity, lithium ion batteries have been widely used in various electronic products.

Generally, lithium secondary batteries are formed through setting an electrode assembly and electrolyte in a battery shell, and sealing the battery shell. Electrode units used in the electrode assembly may be categorized into convolution (winding)-type electrode units, a lamination-type electrode units, and folding-type electrode units according to their structure.

In the related art, a polypropylene layer of a laminated aluminum film is generally used to isolate an anode current collector in an anode sheet. Since the requirements of energy density of an electric roll at the market become higher and higher, a thickness of the polypropylene layer of the laminated aluminum film, and a thickness of the anode current collector become smaller. In one aspect, an anti-puncture strength of the thinned polypropylene layer becomes lower. In another aspect, since the anode current collector of the lithium ion battery is a copper foil, with the restriction of process conditions in the related art, burrs may exist on an end edge of the copper foil, which may cause the case where the burrs on the end edge of the anode puncture a separator and a laminated aluminum film under extreme conditions. However, in a lamination-type or stacking-type lithium ion electric roll, the edge of the thinned anode current collector will become sharper, which increases the probability that the polypropylene layer of the laminated aluminum film is punctured by the anode current collector.

After the polypropylene layer of the laminated aluminum film is punctured, which may cause battery leakage, and more seriously, may result in that the anode is conducted with the aluminum foil layer via contact. In this case, an electrochemical reaction may occur and thus the polypropylene layer of the laminated aluminum film may be subjected to corrosion, which also causes battery leakage and corrosion.

SUMMARY

The present application provides an electrode assembly, and a lithium ion electric roll using the electrode assembly, which is capable of effectively reducing the probability that a packaged laminated aluminum film is punctured by a pole sheet.

Embodiments of the present application provide a battery. The battery includes:
a first layer having
  a first surface;
  a second surface which is opposite to the first surface
  a first side;
  a second side which intersects with the first side of the first layer, and
  a third side which intersects with the second side of the first layer;
a second layer being located at the side of the second surface of the first layer, exposed from the first layer in a first direction view which is perpendicular to the first surface of the first layer, and having
  a first side which faces to the first side of the first layer in the first direction view,
  a second side which intersects with the first side of the second layer, and
  a third side which intersects with the second side of the second layer,
a third layer tucking at least one portion of the second layer with the first layer in the first direction view, being exposed from the second layer in the first direction view, and having
  a first side which faces to the first side of the second layer in the first direction view,
  a second side which intersects with the first side of the third layer, and
  a third side which intersects with the second side of the third layer,
a conductive plate protruding from the second side of the first layer in the first direction view, and
in which a first distance which is from the third side of the first layer to the third side of the second layer is different from a second distance which is from the third side of the second layer to the third side of the third layer.

Embodiments of the present application provide a battery. The battery includes:
a first electrode unit having
  a first surface,
  a second surface which is opposite to the first surface,
  a first side,
  a second side which intersects with the first side of the first electrode unit, and
  a third side which intersects with the second side of the first electrode unit,
a second electrode unit being located at the side of the second surface of the first electrode unit, exposed from the first electrode unit in a first direction view which is perpendicular to the first surface of the first electrode unit, and having
  a first side which faces to the first side of the first electrode unit in the first direction view,
  a second side which intersects with the first side of the second electrode unit, and
  a third side which intersects with the second side of the second electrode unit,
a third electrode unit tucking at least one portion of the second electrode unit with the first electrode unit in the first direction view, being exposed from the second electrode unit in the first direction view, and having
  a first side which faces to the first side of the second electrode unit in the first direction view, a second side which intersects with the first side of the third electrode unit, and
a third side which intersects with the second side of the third electrode unit,
a conductive plate protruding from the second side of the first electrode unit in the first direction view, and
in which a first distance which is from the third side of the first electrode unit to the third side of the second electrode unit is different from a second distance which is from the third side of the second electrode unit to the third side of the third electrode unit.

Embodiments of the present application provide an electrode assembly, including:
a first electrode unit;
a first anti-puncture cushion;
wherein the first electrode unit comprises a first electrode sheet, an second electrode sheet, and a separator, the separator is disposed between the first electrode sheet and the second electrode sheet;
the first anti-puncture cushion is disposed on a side of the first electrode unit along a width direction, and covers an edge of the first electrode sheet.

Embodiments of the present application provide a lithium ion electric roll, including a laminated aluminum film, and the above mentioned electrode assembly, wherein the electrode assembly is wrapped by the laminated aluminum film.

It shall be appreciated that the above general description and the detailed description hereinafter are only illustrative but not for limiting the present application.

REFERENCE NUMERALS AND DENOTATIONS THEREOF

Figure 1:
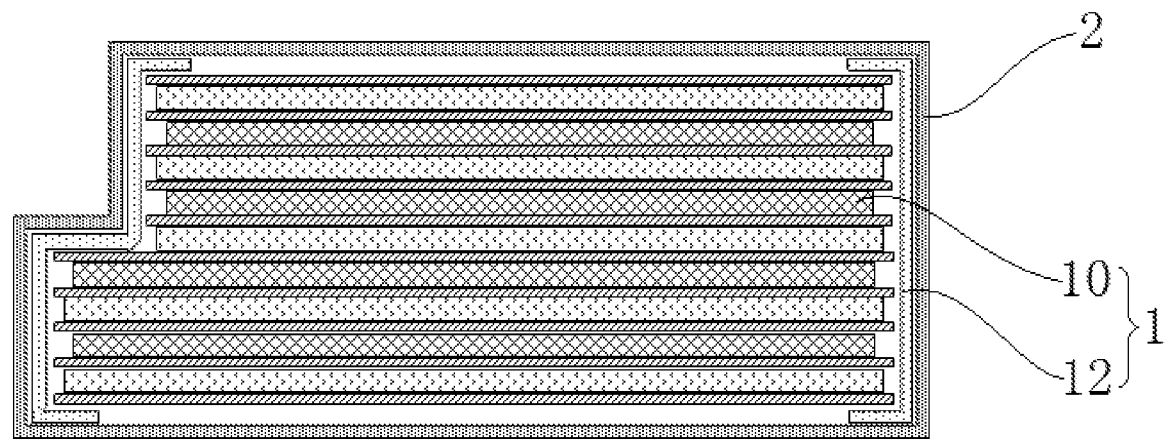
FIG. 1 is a schematic diagram of an integral structure of a lithium ion battery according to the present application.

1—Electrode assembly
10—Bare electric roll
100—Electrode unit
100a—Cathode sheet
100b—Anode sheet
100c—Separator
100d—Rib structure
12—Anti-puncture cushion
2—Laminated aluminum film The accompanying drawings herein, which are incorporated into and constitute a part of the specification, illustrate embodiments consistent with the present application, and together with the specification, serve to explain the principles of the present application.

DETAILED DESCRIPTION

The present application is further described with reference to specific embodiments and accompanying drawings. The terms "front", "behind", "left", "right", "upper" and "lower" described in the present application are given with reference to the state where a lithium ion electric roll is disposed in the accompanying drawings.

Embodiments of the present application provide a battery. The battery includes:
a first layer having
a first surface,
a second surface which is opposite to the first surface,
a first side,
a second side which intersects with the first side of the first layer, and
a third side which intersects with the second side of the first layer,
a second layer being located at the side of the second surface of the first layer, exposed from the first layer in a first direction view which is perpendicular to the first surface of the first layer, and having
a first side which faces to the first side of the first layer in the first direction view,
a second side which intersects with the first side of the second layer, and
a third side which intersects with the second side of the second layer,
a third layer tucking at least one portion of the second layer with the first layer in the first direction view, being exposed from the second layer in the first direction view, and having
a first side which faces to the first side of the second layer in the first direction view,
a second side which intersects with the first side of the third layer, and
a third side which intersects with the second side of the third layer,
a conductive plate protruding from the second side of the first layer in the first direction view, and
in which a first distance which is from the third side of the first layer to the third side of the second layer is different from a second distance which is from the third side of the second layer to the third side of the third layer.

In some embodiments, a third distance from the second side of the first layer to the second side of the second layer is shorter than the first distance in the first direction view.

In some embodiments, a fourth distance from the second side of the first layer to the second side of the third layer is shorter than the first distance in the first direction view.

In some embodiments, the first layer includes:
a first conductive layer, having a first surface, and a second surface which is opposite to the first surface of the first conductive layer;
a first insulating layer, located at the side of the second surface of the first conductive layer; and a second conductive layer, tucking the first insulating layer with the first conductive layer, and
in a width direction view which is parallel to the second side, a width of the first insulating layer is greater than a width of the first conductive layer and a width of the second conductive layer.

In some embodiments, the first conductive layer is an anode electrode, the second conductive layer is a cathode electrode, and the width of the first conductive layer is greater than the width of the second conductive layer.

In some embodiments, in a width direction view which is parallel to the second side, a width of the first layer, a width of the second layer and a width of the third layer are different.

In some embodiments, the first side of the first layer, the first side of the second layer and the first side of the third layer are aligned.

In some embodiments, in a width direction view which is parallel to the second side, a width of the second layer is greater than a width of the first layer, and a width of the third layer is greater than the width of the second layer.

In some embodiments, in a first direction, a thickness of the first layer, a thickness of the second layer and a thickness of the third layer are different.

In some embodiments, the first layer further includes a fourth side which intersects with the third side of the first layer;
the second layer further includes a fourth side which intersects with the third side of the second layer;
the third layer further includes a fourth side which intersects with the third side of the third layer;
a fifth distance is formed from the fourth side of the first layer to the fourth side of the second layer; and
a sixth distance is formed from the fourth side of the second layer to the fourth side of the third layer.

In some embodiments, in a length direction view which is parallel to the first side, a length of the first layer, a length of the second layer and a length of the third layer are different.

In some embodiments, at least one of the first layer, the second layer and the third layer includes an anode sheet, a separator and a cathode sheet, the anode sheet, the separator and the cathode sheet are arranged in a stacking manner.

In some embodiments, in a width direction view which is parallel to the second side, a width of the first layer equals to a width of the second layer or a width of the third layer, or a width of the second layer equals to a width of the third layer.

In some embodiments, the first distance is smaller than the second distance.

In some embodiments, the third distance equals to the fourth distance.

Embodiments of the present application provide a battery. The battery includes:
a first electrode unit having
a first surface,
a second surface which is opposite to the first surface,
a first side,
a second side which intersects with the first side of the first electrode unit, and
a third side which intersects with the second side of the first electrode unit,
a second electrode unit being located at the side of the second surface of the first electrode unit, exposed from the first electrode unit in a first direction view which is perpendicular to the first surface of the first electrode unit, and having a first side which faces to the first side of the first electrode unit in the first direction view,
a second side which intersects with the first side of the second electrode unit, and
a third side which intersects with the second side of the second electrode unit,
a third electrode unit tucking at least one portion of the second electrode unit with the first electrode unit in the first direction view, being exposed from the second electrode unit in the first direction view, and having
a first side which faces to the first side of the second electrode unit in the first direction view,
a second side which intersects with the first side of the third electrode unit, and
a third side which intersects with the second side of the third electrode unit,
a conductive plate protruding from the second side of the first electrode unit in the first direction view, and
in which a first distance which is from the third side of the first electrode unit to the third side of the second electrode unit is different from a second distance which is from the third side of the second electrode unit to the third side of the third electrode unit.

In some embodiments, a third distance from the second side of the first electrode unit to the second side of the second electrode unit is shorter than the first distance in the first direction view.

In some embodiments, a fourth distance from the second side of the first electrode unit to the second side of the third electrode unit is shorter than the first distance in the first direction view.

In some embodiments, the first electrode unit includes:
a first conductive layer, having a first surface, and a second surface which is opposite to the first surface of the first conductive layer;
a first insulating layer, located at the side of the second surface of the first conductive layer; and
a second conductive layer, tucking the first insulating layer with the first conductive layer, and
in a width direction view which is parallel to the second side, a width of the first insulating layer is greater than a width of the first conductive layer and a width of the second conductive layer.

In some embodiments, in a first direction, a thickness of the first electrode unit, a thickness of the second electrode unit and a thickness of the third electrode unit are different.

In some embodiments, the first electrode unit further includes a fourth side which intersects with the third side of the first electrode unit;
the second electrode unit further includes a fourth side which intersects with the third side of the second electrode unit;
the third electrode unit further includes a fourth side which intersects with the third side of the third electrode unit;
a fifth distance is formed from the fourth side of the first electrode unit to the fourth side of the second electrode unit; and
a sixth distance is formed from the fourth side of the second electrode unit to the fourth side of the third electrode unit.

Figure 2:
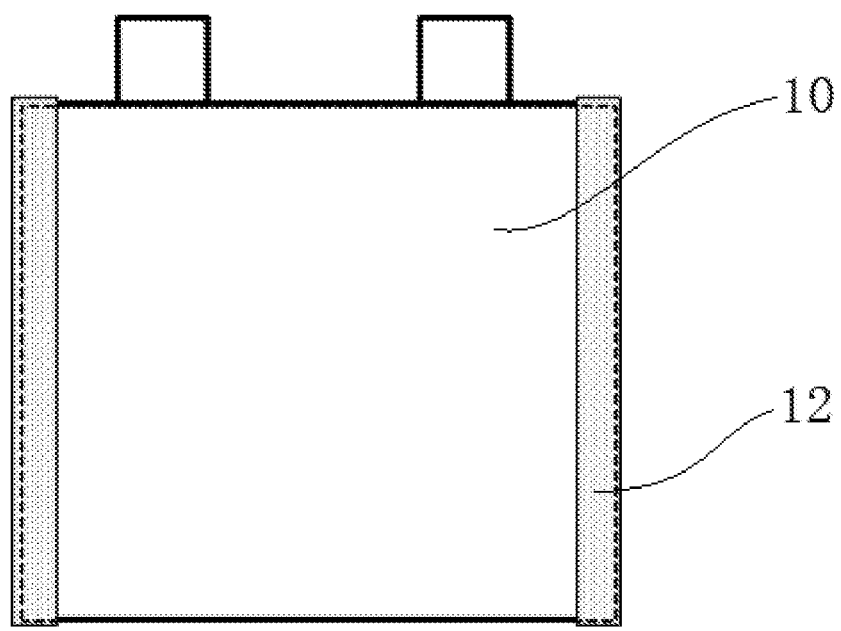
FIG. 2 is a schematic diagram of an exterior structure of an electrode assembly formed by a single lamination-type electrode unit according to the present application.
Figure 4:
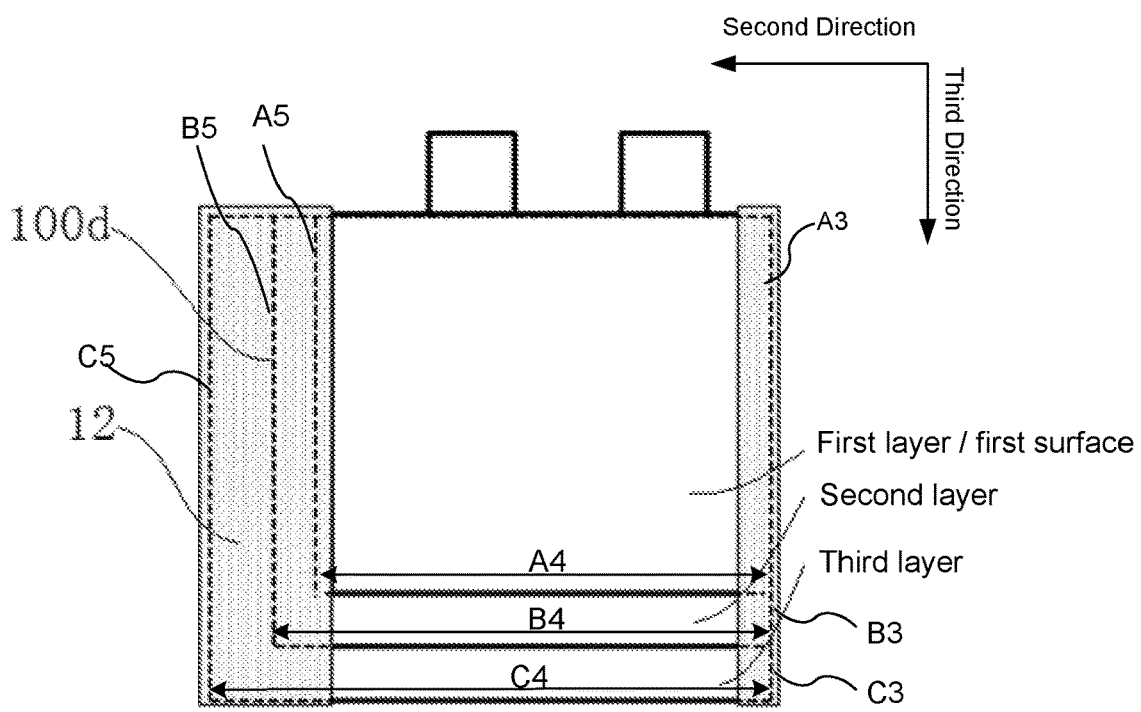
FIG. 4 is a schematic diagram of an exterior structure of an electrode assembly formed by a plurality of lamination-type electrode units according to the present application.
Figure 6:
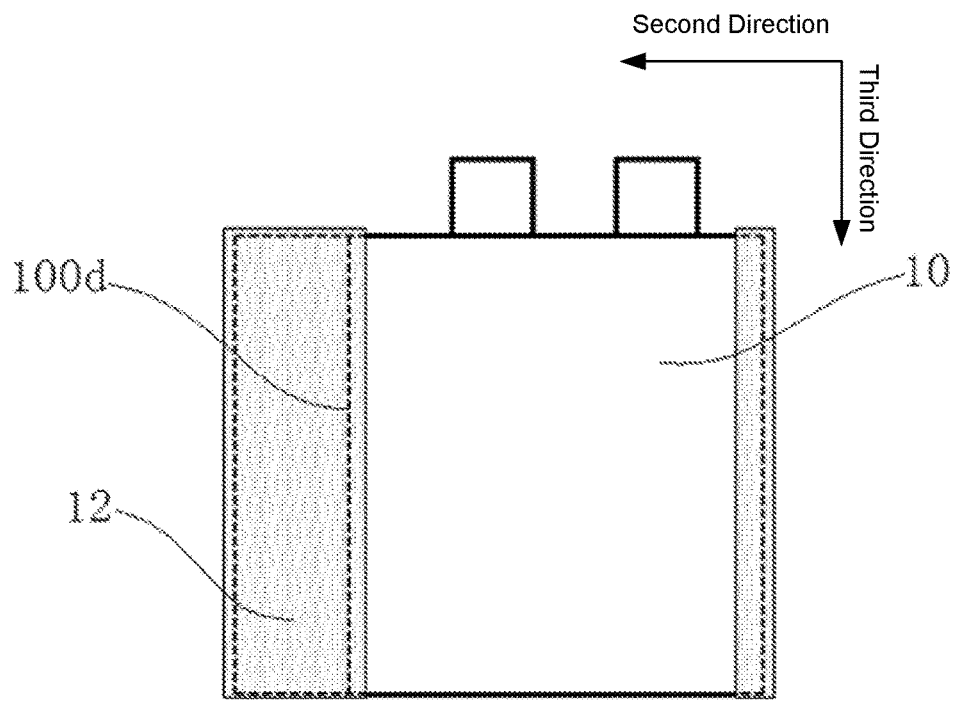
FIG. 6 is a schematic diagram of an exterior structure of an electrode assembly formed by a plurality of convolution-type electrode units according to the present application.

As illustrated in FIG. 1, a lithium ion electric roll is provided according to an embodiment of the present application, wherein the lithium ion electric roll comprises an electrode assembly 1 and a laminated aluminum film 2. As illustrated in FIG. 2, the electrode assembly 1 comprises a bare electric roll 10 and an anti-puncture cushion 12;

wherein the bare electric roll 10 is a main electric energy generating component of the lithium ion electric roll, and generally comprises at least one electrode unit 100, each electrode unit 100 including a cathode sheet 100*a*, an anode sheet 100*b*, and a separator 100*c*; wherein the cathode sheet 100*a* is isolated from the anode sheet 100*b* by the separator 100*c*, such that the cathode sheet 100*a* and the anode sheet 100*b* may be subjected to an electrochemical reaction under the effect of an electrolyte. The anti-puncture cushion 12 is arranged on two sides along a width direction of the bare electric roll 10 (extending leftward and rightward along the paper surface in FIG. 2), and covers an edge of the anode sheet 100*b*. Finally, the electrode assembly 1 is entirely wrapped by the laminated aluminum film 2 from the outer side. In this case, the anti-puncture cushion 12 may serve as a barrier between the laminated aluminum film 2 and the anode sheet 100*b*. With the protection isolation structure, the anode sheet 100*b* may be isolated by the anti-puncture cushion 12, and thus fails to be in direct contact with the laminated aluminum film 2, thereby reducing the probability that the laminated aluminum film 2 is punctured (referring to FIG. 1). The corners on the top and at the bottom of the anode sheet 100*b* are sharp, and a polypropylene layer of the laminated aluminum film 2 may be possibly punctured by the anode sheet 100*b* along the top or bottom direction in the case where the anode sheet 100*b* along a width direction is covered by the anti-puncture cushion 12. In this case, this embodiment provides a corresponding protection measure to the polypropylene layer of the laminated aluminum film 2. To be specific, as illustrated in FIGS. 2, 4, and 6, in this embodiment, an edge of the anti-puncture cushion 12 along a top and/or bottom direction of the bare electric roll 10 exceeds the anode sheet 100*b*. In this way, after the electrode assembly 1 is wrapped by the laminated aluminum film 2, the portion exceeding the anode sheet 100*b* of the edge of the anti-puncture cushion 12 can be bent, such that the corners of the anode sheet 100*b* are completely wrapped by the anti-puncture cushion 12, thereby preventing polypropylene layer from piercing by the corners.

Considering manufacture difficulty, electric roll capacity and the like, preferably, a plurality of electrode units 100 are simultaneously used for the bare electric roll 10, and these electrode units are sequentially arranged in a stacking manner along a thickness direction. To ensure that the anode sheet 100*b* in each of the electrode units 100 is isolated from the laminated aluminum film 2, the anode sheet 100*b* in each of the electrode units 100 needs to be covered by the anti-puncture cushion 12.

Figure 7:
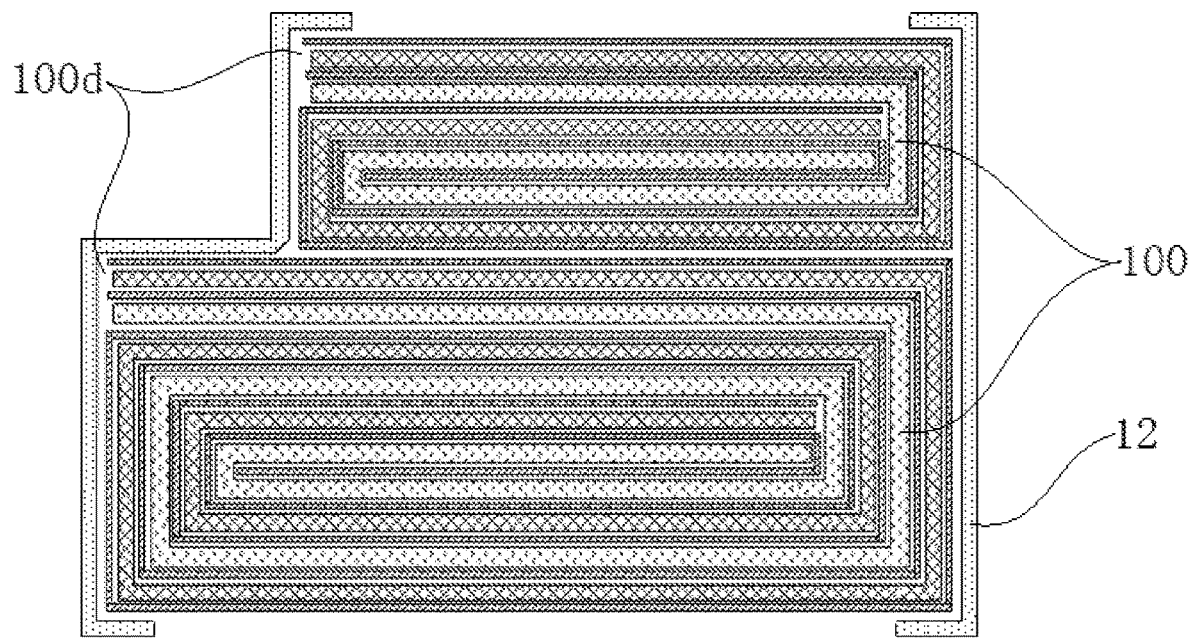
FIG. 7 is a schematic structural diagram of a cross section of FIG. 6.
Figure 10:
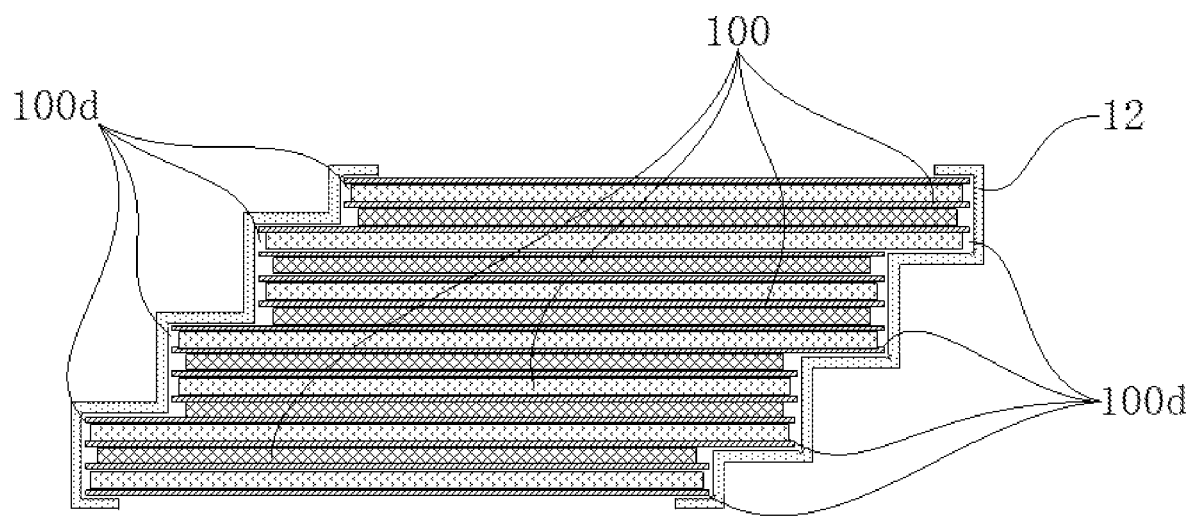
FIG. 10 is a schematic diagram illustrating partially staggering of adjacent electrode units along a width direction according to the present application.

The thicknesses of the electrode units 100 may be different, and meanwhile, the area vertical to a thickness direction may be adjusted according to the capacity of the electric roll, or regional spatial structure and volume desired for accommodating the electric roll. For example, the widths of two adjacent electrode units 100 are different (as illustrated in FIG. 7); or for another example, as illustrated in FIG. 10, the widths of four electrode units 100 are the same, but the thicknesses thereof are different. When the electrode units 100 are arranged in a stacking manner, electrode units 100 in each layer relative to the lower electrode units 100 are partially staggered rightward along a width direction. Nevertheless, there is more complicated situation, for example, size difference still exists in the plurality of electrode units 100 along a length direction (extending in a direction vertical to the paper surface in FIG. 10); or, the plurality of electrode units 100 are partially staggered, which is not described herein any further.

When the above case occurs, a rib structure 100*d* is formed on two sides or on one side along a width direction of the two adjacent electrode units 100. Since an edge of the rib structure 100*d* projects outwards and is sharp, the polypropylene layer of the laminated aluminum film 2 is easily punctured. In order to cope with this situation, the rib structure 100*d* is clad with the anti-puncture cushion 12 in this embodiment.

Figure 3:
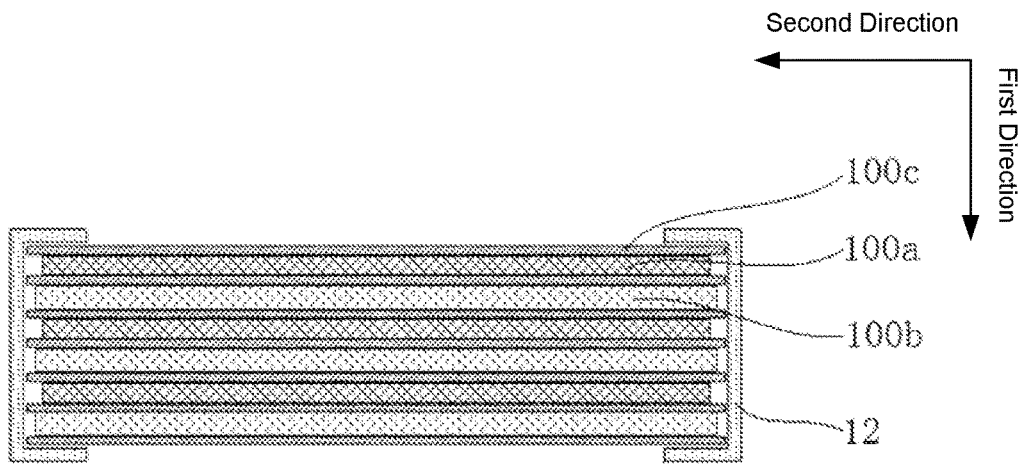
FIG. 3 is a schematic structural diagram of a cross section of FIG. 2.
Figure 5:
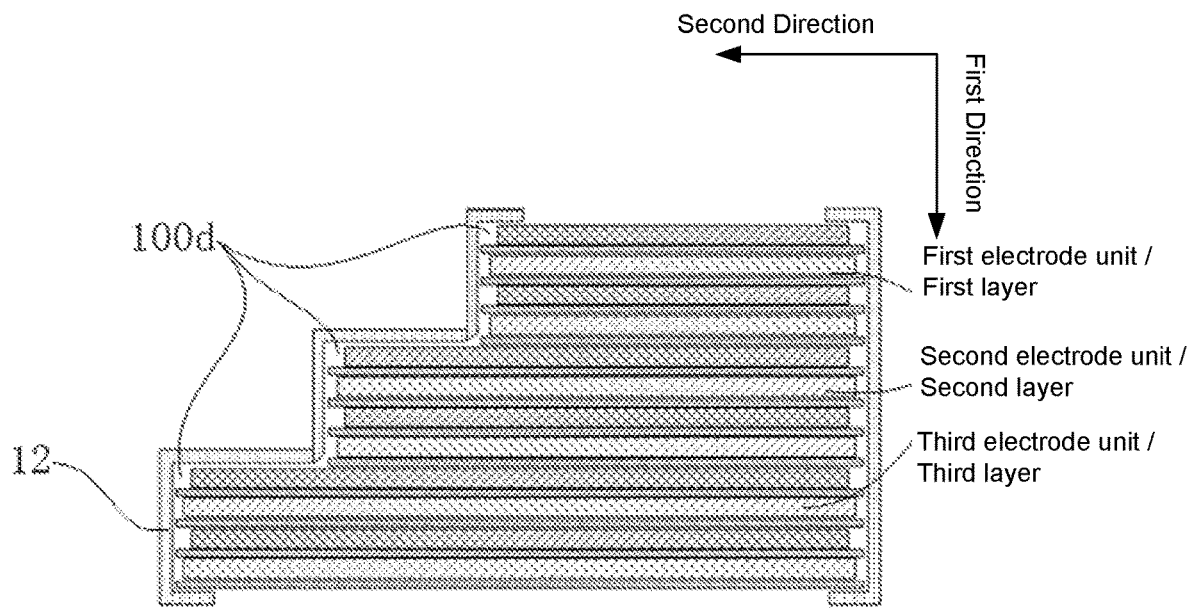
FIG. 5 is a schematic structural diagram of a cross section of FIG. 4.
Figure 8:
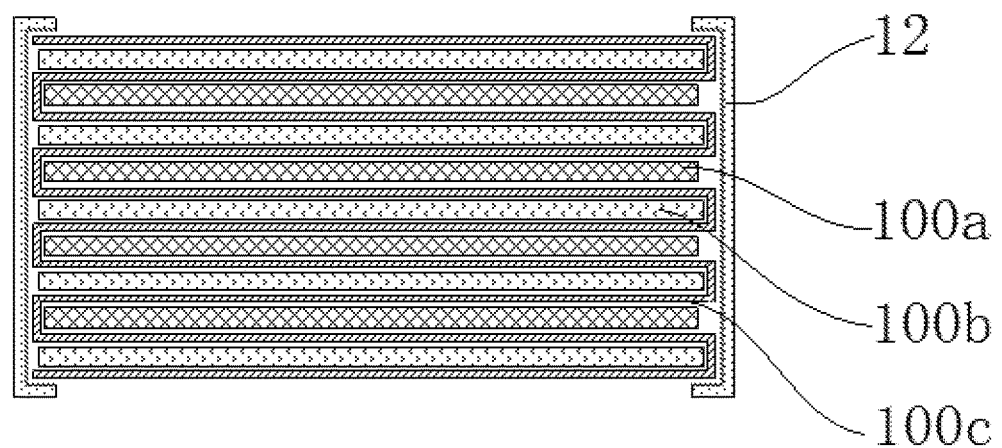
FIG. 8 is a schematic diagram of an exterior structure of an electrode assembly of a single folding-type electrode unit according to the present application.

In this embodiment, the electrode unit 100 may employ various types, such as, lamination type, convolution type, a folding type, and the like. For example, the electrode assembly 1 as illustrated in FIGS. 2 and 3 only comprises lamination-type electrode units 100. In the electrode unit 100, the cathode sheet 100*a*, the separator 100*c*, and the anode sheet 100*b* are alternately stacked. However, the electrode assembly 1 as illustrated in FIGS. 4 and 5 comprises three lamination-type electrode units 100 with the lengths and widths sequentially decreasing. For another example, the electrode assembly 1 as illustrated in FIGS. 6 and 7 comprises convolution-type electrode units 100 with the lengths and widths sequentially decreasing, such that the bare electric roll 10 forms an edge structure similar to a step-like shape. Still for another example, the electrode assembly 1 as illustrated in FIG. 8, the cathode sheet 100*a* and the anode sheet 100*b* are arranged in a stacking manner, and the separators 100*c* may serve as barriers sequentially between the adjacent cathode sheet 100*a* and the anode sheet 100*b* in a folding manner, to form the folding-type electrode units.

Figure 9:
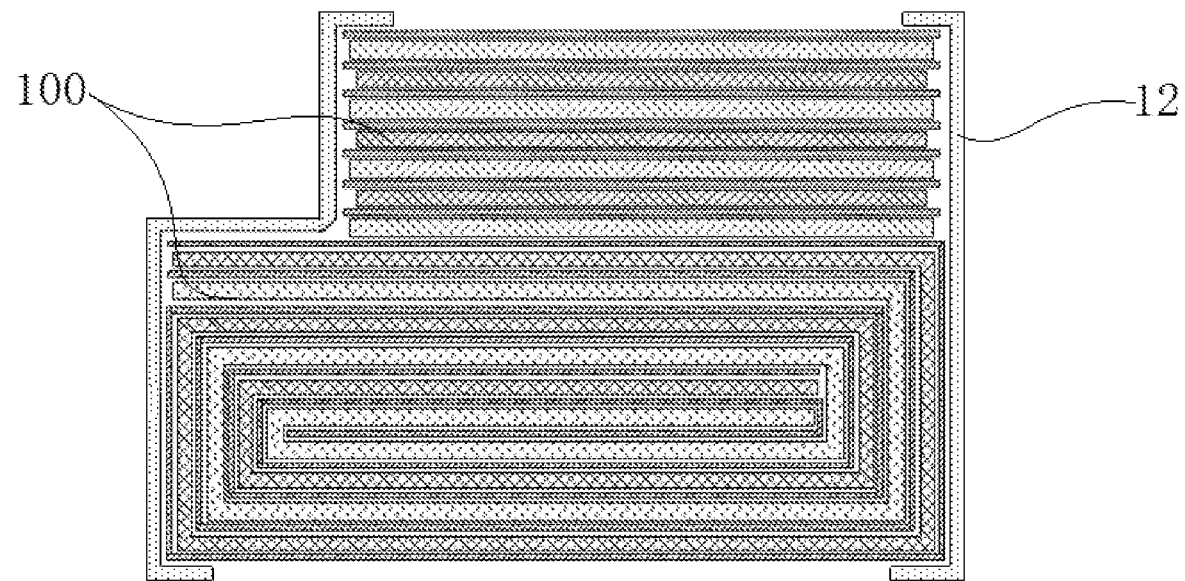
FIG. 9 is a schematic diagram of an exterior structure formed by hybrid stacking of a plurality of types of electrode units according to the present application.

In addition, when a plurality of electrode units 100 simultaneously are used in one bare electric roll 10, each of the plurality of electrode units 100 may select different types according to actual requirements. For example, the electrode assembly 1 as illustrated in FIG. 9 comprises one lamination-type electrode unit 100 with a smaller width, and one convolution-type electrode unit 100 with a greater width. The right sides of two electrode units 100 are aligned.

In this embodiment, the anti-puncture cushion 12 may be divided into multiple sections, for example, an upper section, and a lower section, or several sections in a parallel arrangement along the thickness direction; wherein each section of the anti-puncture cushion 12 is separately adhered on two sides along the width direction of the bare electric roll. Or, each section of the anti-puncture cushion 12 is directly adhered on two sides along the width direction of the bare electric roll 1, and completely warps the two sides of the bare electric roll 10. In this manner, the anode sheet 100*b* and the rib structure 100*d* may be all covered together, and compared with the multi-section process, this process is simple and easy to operate. A viscous tape may be directly selected for the anti-puncture cushion 12. For example, a biaxially oriented polypropylene (BOPP) tape which is commonly used on the lithium ion battery is selected, for example, a green glue commonly known.

The probability that the laminated aluminum film 2 is punctured by the anode current collector of the anode sheet is significantly reduced by the lithium ion electric roll according to this embodiment.

The technical solutions provided in the present application may achieve the following beneficial effects:

An lithium ion electric roll according to the present application is capable of increasing a layer of protection isolation structure between an anode current collector and a laminated aluminum film by using an anti-puncture cushion which is arranged on outer side of the anode current collector and is arranged on two sides of a bare electric roll, which significantly lowers the probability of that the laminated aluminum film is punctured by a pole sheet.

Described above are merely preferred embodiments of the present application, but are not intended to limit the present application. A person skilled in the art may derive various modifications and variations. Any modification, equivalent replacement, or improvement made without departing from the spirit and principle of the present application should fall within the protection scope of the present application.

What is claimed is:

1. A battery, comprising:
a first layer including a number of stacked first electrode units, wherein the number is a positive integer that is at least two, the stacked first electrode units are part of a bare electric roll, the bare electric roll has a top portion and a bottom portion defined along a first direction, the first layer having:
a first surface,
a second surface opposite to the first surface,
a first edge of the first layer,
a second edge of the first layer, wherein the second edge of the first layer intersects with the first edge of the first layer, and
a third edge of the first layer, wherein the third edge of the first layer intersects with the second edge of the first layer;
wherein the first layer is disposed directly on top of a second layer;
the second layer including a number of stacked second electrode units that is equal to the number of stacked first electrode units, the stacked second electrode units are part of the same bare electric roll as the stacked first electrode units, the second layer located between the second surface of the first layer and a third layer, wherein the second layer is partially exposed from the first layer in the first direction, and the first direction is perpendicular to the first surface of the first layer, and the second layer having
a first edge of the second layer,
a second edge of the second layer, wherein the second edge of the second layer intersects with the first edge of the second layer; and
a third edge of the second layer, wherein the third edge of the second layer intersects with the second edge of the second layer; and
the third layer tucking within at least one portion of the second layer with the first layer in the first direction, wherein the third layer includes one or more stacked third electrode units and is partially exposed from the second layer in the first direction, and the third layer having
a first edge of the third layer,
a second edge of the third layer, wherein the second edge of the third layer intersects with the first edge of the third layer; and
a third edge of the third layer, wherein the third edge of the third layer intersects with the second edge of the third layer;
wherein the first edge of the first layer, the first edge of the second layer, and the first edge of the third layer are sequentially arranged in the first direction when viewed in a second direction perpendicular to the first direction,
a conductive plate protruding from the first layer in the first direction, and
an anti-puncture cushion partially disposed on the first surface on the first layer, wherein,
the anti-puncture cushion extends from the at least a portion of first surface of the first layer along the second direction to at least a portion of an anode sheet of the third layer; and
an edge of the anti-puncture cushion along the top portion and/or the bottom portion of the bare electric roll exceeds the anode sheet.

2. The battery according to claim 1, wherein a third distance measured from the second edge of the first layer to the second edge of the second layer is shorter than the first distance in the first direction.

3. The battery according to claim 2, wherein a fourth distance measured from the second edge of the first layer to the second edge of the third layer is shorter than the first distance in the first direction.

4. The battery according to claim 3, wherein the first layer comprises:
a first conductive layer having a first surface and a second surface opposite to the first surface of the first conductive layer;
a first insulating layer located at the side of the second surface of the first conductive layer; and
a second conductive layer tucking the first insulating layer with the first conductive layer; and
wherein in a second direction parallel to the second edge of the first layer, a width of the first insulating layer is greater than a width of the first conductive layer and a width of the second conductive layer.

5. The battery according to claim 4, wherein the first conductive layer is an anode electrode, the second conductive layer is a cathode electrode, and the width of the first conductive layer is greater than the width of the second conductive layer.

6. The battery according to claim 1, wherein in a second direction parallel to the second edge of the first layer, a width of the first layer, a width of the second layer and a width of the third layer are different from each other.

7. The battery according to claim 1, wherein the first edge of the first layer, the first edge of the second layer and the first edge of the third layer are aligned.

8. The battery according to claim 7, wherein in a second direction parallel to the second edge of the first layer, a width of the second layer is greater than a width of the first layer, and a width of the third layer is greater than the width of the second layer.

9. The battery according to claim 1, wherein in the first direction, a thickness of the first layer, a thickness of the second layer and a thickness of the third layer are different from each other.

10. The battery according to claim 1, wherein the first layer further comprises a fourth edge of the first layer; the fourth edge of the first layer intersects with the third edge of the first layer;
the second layer further comprises a fourth edge of the second layer; the fourth edge of the second layer intersects with the third edge of the second layer;
the third layer further comprises a fourth edge of the third layer; the fourth edge of the third layer intersects with the third edge of the third layer;
the second layer is partially exposed from the first layer between the fourth edge of the first layer and the fourth edge of the second layer in the first direction; and
the third layer is partially exposed from the second layer between the fourth edge of the third layer and the fourth edge of the second layer in the first direction.

11. The battery according to claim 1, wherein in a third direction parallel to the first edge of the first layer, a length of the first layer, a length of the second layer and a length of the third layer are different from each other.

12. The battery according to claim 1, wherein at least one of the first layer, the second layer and the third layer comprises an anode sheet, a separator and a cathode sheet; the anode sheet, the separator and the cathode sheet are arranged in a stacking manner in the first direction.

13. The battery according to claim 1, wherein in a second direction parallel to the second edge of the first layer, a width of the first layer equals to a width of the second layer or a width of the third layer, or a width of the second layer equals to a width of the third layer.

14. The battery according to claim 1, wherein the first distance is smaller than the second distance.

15. The battery according to claim 3, wherein the third distance equals to the fourth distance.

16. A battery, comprising:
a first electrode unit including a number of stacked first electrode subunits, wherein the number is a positive integer that is at least two, the first electrode unit is part of a bare electric roll, the bare electric roll has a top portion and a bottom portion defined along a first direction, the first electrode unit having:
a first surface;
a second surface opposite to the first surface;
a first edge of the first electrode unit;
a second edge of the first electrode unit, wherein the second edge of the first electrode unit intersects with the first edge of the first electrode unit; and
a third edge of the first electrode unit, wherein the third edge of the first electrode unit intersects with the second edge of the first electrode unit;
wherein the first electrode unit is disposed directly on top of a second electrode unit;
the second electrode unit including a number of stacked second electrode subunits that is equal to the number of stacked first electrode subunits, the stacked second electrode unit are part of the same bare electric roll as the first electrode unit, the second electrode unit located between the second surface of the first electrode unit and a third electrode unit, wherein the second electrode unit is partially exposed from the first electrode unit in the first direction, and the first direction is perpendicular to the first surface of the first electrode unit, and the second electrode unit having:
a first edge of the second electrode unit;
a second edge of the second electrode unit, wherein the second edge of the second electrode unit intersects with the first edge of the second electrode unit; and
a third edge of the second electrode unit, wherein the third edge of the second electrode unit intersects with the second edge of the second electrode unit; and
the third electrode unit tucking within at least one portion of the second electrode unit with the first electrode unit in the first direction, wherein the third electrode unit includes one or more stacked third electrode subunits and is partially exposed from the second electrode unit in the first direction, and the third electrode unit having:
a first edge of the third electrode unit;
a second edge of the third electrode unit, wherein the second edge of the third electrode unit intersects with the first edge of the third electrode unit; and
a third edge of the third electrode unit, wherein the third edge of the third electrode unit intersects with the second edge of the third electrode unit;
wherein the first edge of the first electrode unit, the first edge of the second electrode unit, and the first edge of the third electrode unit are sequentially arranged in the first direction when viewed in a second direction perpendicular to the first direction,
a conductive plate protruding from the first electrode unit in the first direction, and
an anti-puncture cushion partially disposed on the first surface on the first layer, wherein,
the anti-puncture cushion extends from the at least a portion of first surface of the first layer along the second direction to at least a portion of an anode sheet of the third layer; and
an edge of the anti-puncture cushion along the top portion and/or the bottom portion of the bare electric roll exceeds the anode sheet.

17. The battery according to claim 16, wherein a third distance measured from the second edge of the first electrode unit to the second edge of the second electrode unit is shorter than the first distance in the first direction.

18. The battery according to claim 17, wherein a fourth distance from the second edge of the first electrode unit to the second edge of the third electrode unit is shorter than the first distance in the first direction.

19. The battery according to claim 18, wherein the first electrode unit comprises:
a first conductive layer, having a first surface, and a second surface which is opposite to the first surface of the first conductive layer;
a first insulating layer, located at the side of the second surface of the first conductive layer; and
a second conductive layer, tucking the first insulating layer with the first conductive layer; and
wherein in a second view which is parallel to the second edge of the first layer, a width of the first insulating layer is greater than a width of the first conductive layer and a width of the second conductive layer.

20. The battery according to claim 16, wherein in the first direction of the first layer, a thickness of the first electrode unit, a thickness of the second electrode unit and a thickness of the third electrode unit are different from each other.

21. The battery according to claim 16, wherein the first electrode unit further comprises a fourth edge which intersects with the third edge of the first electrode unit;
the second electrode unit further comprises a fourth edge which intersects with the third edge of the second electrode unit;
the third electrode unit further comprises a fourth edge which intersects with the third edge of the third electrode unit;
the second electrode unit is partially exposed from the first electrode unit between the fourth edge of the electrode unit and the fourth edge of the electrode unit in the first direction; and
the third electrode unit is partially exposed from the second electrode unit between the fourth edge of the third electrode unit and the fourth edge of the second electrode unit in the first direction.

* * * * *